Oct. 27, 1931.    J. H. BROWN    1,828,829
TRIMMING MACHINE
Filed Dec. 4, 1928

Patented Oct. 27, 1931

1,828,829

UNITED STATES PATENT OFFICE

JOHN HENRY BROWN, OF LEICESTER, ENGLAND, ASSIGNOR TO UNITED SHOE MACHINERY CORPORATION, OF PATERSON, NEW JERSEY, A CORPORATION OF NEW JERSEY

TRIMMING MACHINE

Application filed December 4, 1928, Serial No. 323,762, and in Great Britain December 10, 1927.

This invention relates to trimming machines and is herein illustrated as embodied in a machine designed particularly to trim fins of overflow from molded rubber articles, for example, rubber soles and heels. It is to be understood, however, that in its broader aspects the invention is not limited to machines for trimming articles made of rubber.

The illustrated machine comprises, among other things, a pair of rotary circular cutting disks co-operatively related to sever the material that requires to be trimmed off. One of the objects of the invention is to provide an improved construction and arrangement of co-operative disk cutters that will not only insure smooth and even trimming but will also insure long service of the cutters without appreciable deterioration of their effectiveness.

Accordingly a novel feature of the invention consists in a pair of rotary circular disk cutters having narrow circumferential surfaces arranged in registering relation, and front faces which, together with the circumferential surfaces, form sharp, non-acute circular edges that lie in a common plane, and means arranged to maintain the cutters out of contact with each other but so nearly in contact as to insure the severance of thin material passed between them. As illustrated, the cutting disks have circumferential surfaces whose axial dimension is about 7/1000 of an inch, this dimension having been found sufficient to provide for long service and at the same time to make clean cutting possible, provided the work engaging portions of the circumferential surfaces are maintained, to all intents and purposes, in registering relation with each other. When the cutters are used to sever materials such as rubber, leather, cloth and paper they reduce the material between them to a thickness so minute that its tensile strength is rendered practically nil, and the result is that whatever material remains along the line traversed by the cutters is too weak to prevent division of the material along that line. Moreover, since the cutters do not actually touch or bear one upon the other, they will not chip each other and are subjected to so little wear that their sharp edges remain in a satisfactory condition for a long time.

The illustrated machine also comprises two relatively movable frame elements operatively connected one to the other, the co-operative cutting disks being mounted respectively in these frames to provide for regulating the space between their circumferential surfaces and also to provide for relatively separating the cutters when it is desired to introduce an article of work between them. As illustrated, the machine is provided with an abutment against which one of the frame elements is normally maintained by resilient means having sufficient power to insure penetration of the work by the cutters, the abutment being preferably adjustable to regulate the space between the cutters in accordance with the principle above pointed out.

The invention also provides means for alining the cutters, that is, for effecting relative axial adjustment to place their circumferential surfaces in registering relation to each other.

Other features of the invention are hereinafter described and claimed and are illustrated in the drawings.

Referring to the drawings,

Fig. 1 is a side elevation of the head of a trimming machine in which the novel features of the invention are embodied;

Fig. 2 is a front elevation thereof omitting certain parts included in Fig. 1;

Fig. 3 is a side elevation on a greatly enlarged scale of the contiguous portions of the cutting disks;

Fig. 4 is a front elevation representing the cutting disks and a device adapted to be temporarily applied thereto for setting their circumferential surfaces in registering relation;

Fig. 5 is a vertical section through the work supporting table and through the adjustable means by which it is supported in operative position;

Figs. 6 and 7 illustrate, respectively, a front elevation and a side elevation of a guard or gage suitable for guiding rubber soles provided with convexly beveled profiles;

Fig. 8 is a front elevation of a roller gage suitable for use when the machine is used to operate on rubber soles having square profiles; and Fig. 9 is a front elevation of a guard or gage suitable for use when the machine is used to operate on rubber heels or the toe portions of rubber soles having short radii of curvature.

Referring to Figs. 1 and 2, a horizontal driven shaft 10 is mounted to rotate in bearings formed in a main frame element 12. This shaft may be driven by any preferred means, for example, a pulley 14 loosely mounted thereon and a controllable clutch 16 for effecting a driving connection between the pulley and shaft. A circular disk cutter 18 is affixed to the forward end of the shaft 10 and its hub abuts a front face of the frame 12 to prevent axial displacement of the shaft toward the rear. The hub of a spur gear 20 also affixed to the shaft 10 abuts a rear face of the frame 12 and prevents axial displacement of the shaft toward the front.

A rotary circular cutting disk 22 is arranged above the disk 18 and is co-operatively related thereto. The disk 22 is affixed to the forward end of a horizontal shaft 24, the axes of the shafts 10 and 24 being parallel. The shaft 24 is journaled in a frame element 26 movable relatively to the frame 12 but operatively connected thereto by a horizontal cylindrical rod 28. The frame 12 is bored to provide a socket through which the rod 28 extends, the ends of the rod projecting beyond the front and rear of the frame 12 and through ears 30 formed on the movable frame element 26 which is in the form of a yoke and straddles the frame 12. The hub of the cutter 22 abuts a front face of the frame member 26 while the hub of a spur gear 32 affixed to the rear end of the shaft 24 abuts a rear face of the member 26. A collar 34 affixed to the rod 28 and a shoulder 35 formed on the rod engage opposite faces of one of the ears 30 of the frame member 26 to maintain the cutter 22 in registering relation to the cutter 18. To set the cutters 18 and 22 in registering relation, the cutter 22 is shifted axially to the front or rear, as the case may be, the shaft 24, the movable frame element 26 and the rod 28 all partaking of this shifting or adjusting movement. The adjustment is maintained by a set screw 36 screwed into the frame 12 and arranged to engage the rod 28 and thereby fix the position of the rod.

The spur gear 20 meshes with the spur gear 32 so that the disk 22 is driven, from the main shaft 10, in the opposite direction to that of the lower disk 18.

Referring to Fig. 3, which represents the contiguous portions of the cutters 18 and 22 on a greatly enlarged scale, each cutter is made of hardened steel and is provided with a cylindric circumferential surface 40, a frusto-conical front face 42, a flat front face 44 and a frusto-conical rear face 46. The axial dimension of the circumferential faces 40 is about 7/1000 of an inch. Sharp circular edges 48 are formed at the junctions of the circumferential surfaces 40 and the frusto-conical front faces 42 but the angles thus formed are not acute. Likewise sharp edges 50 are formed at the junctions of the circumferential surfaces 40 and the frusto-conical rear faces 46 but here also the angles are also not acute. The sharp circular edges 48 lie in a common plane.

In practice, the cutting disks are adjusted to the relation shown in Fig. 3 in which the circumferential surfaces 40 almost but not quite touch each other, a small clearance being desirable to prevent the disks from chipping and dulling each other. For the purpose of this adjustment the frame 12 is provided with an adjustable abutment 52 to engage an ear 54 projecting from the movable frame 26. This abutment, as shown, is a bolt screwed into an ear 56 formed on the frame 12 and held in adjusted position by a lock nut 58. The ear 54 is normally maintained seated upon the abutment 52 by a moderately strong compression spring 60 maintained under sufficient initial compression to insure penetration and severance of the work by the cutters 18 and 22. The spring may be put under any desired degree of compression by an adjustable backing screw 62. The parts 60 and 62 are inserted into a socket formed in an overhanging portion of the frame 12 above the movable frame element 26, a sliding plug 64 being interposed between the spring and a portion of the frame element 26 to bear on the latter.

If desired, the movable frame element 26 may be provided with an arm 66 (Fig. 2) as means for lifting the cutter 22 away from the cutter 18. The outer end of this arm may be connected by a rod or chain 67 to a treadle (not shown). When the arm 66 is depressed it produces angular movement of the frame member 26 relatively to the fixed supporting rod 28, but since the frame member 26 is held against movement lengthwise of the rod and since the cutter 16 is held against axial movement relative to the frame member 26, the registering relation of the cutters is not disturbed by so moving the arm.

The illustrated machine is also provided with a circular work supporting table 68 (Fig. 1) arranged to rotate about an upright axis. This table is arranged in front of the cutters and is supported by a horizontal rod 70 projecting from a socket formed in the frame 12 and adjustably secured in said socket by a set screw 71. The outer end of the rod 70 is forked and the space between its branches is occupied by a flat shank 72 of a member 73 provided with a socket 74 for the reception of a cylindrical stud 75 affixed to the work table. The upper end of the member 73 supports the table and the stud 75 is free to turn in its socket. The shank 72 is provided with a slot 76 through which a clamping bolt 77 extends, the bolt extending also through the branches of the forked end of the rod 70 and having screw connection with an internal thread in one of the brances. This connection provides for angular movement of the socket member 73 relative to the rod 70 and also provides for adjusting the socket member up and down. By tightening the bolt 77 the branches of the rod 70 are drawn toward each other to clamp the shank 72 between them. The clamping bolt may be provided with a nut 78 to furnish additional clamping pressure.

In practice, the work to be severed runs over the top of the lower cutter 18 and is supported at a constant level by the circumferential surface 40 of that cutter. Moreover, the upper surface of the rotary work table 68 is located in a plane tangent to the highest point of the work-supporting surface 40 of the cutter 18. This plane may be horizontal or inclined according to the characteristics of the work or the preference of the user, the described provisions for adjusting the socket member 73 being capable of compounding angular adjustment and up-and-down adjustment as may be required. Moreover, the rod 70 may be adjusted angularly about its axis to rock the table from side to side and may also be adjusted lengthwise of its axis to regulate the distance between the perimeter of the table and the cutter 18.

When severing or trimming articles made of or containing rubber, it is commonly desirable to lubricate the surfaces of the cutters. Accordingly, the illustrated machine is provided with means for supplying a liquid lubricant (water being commonly used) to the upper cutter 22 from which some of the liquid flows to the lower cutter. As shown in Fig. 1 a cup 79 for supplying the lubricating liquid is arranged above the upper cutter so that the liquid will flow by gravity through a flexible tube 80. The upper end of this tube is in communication with the cup 79 and the lower end is coupled to a delivery nozzle 81 projecting from and affixed to a portion of the frame element 26. The lower end of the nozzle 81 is directly over and close to the upper portion of the cutter 22 so that the lubricating liquid that drips therefrom will fall on the cutter. The supply cup 79 is supported by a bracket 82 affixed to the frame 12.

Gages or guards of various types may be employed according to various physical characteristics of the articles of work to be severed or trimmed. For example, a gage 83 (Figs. 1 and 2) is suitable for use when the machine is employed to trim fins of overflow from molded rubber heels. The gage 83 is provided with a slot 84 to receive the shank of a clamping screw 85, a portion of the movable frame 26 being bored and tapped to receive the screw. When the gage is attached it projects downwardly in front of and close to the upper cutter 22, the slot 84 providing for vertical adjustment of the gage to regulate the space between its lower end and the work table. The profile of a heel would be held against the front face of this gage while a fin of overflow to be severed would project under the gage.

The gage 86, shown in Figs. 6 and 7, is suitable for use when the machine is employed to trim fins of overflow from molded rubber soles having convexly beveled profiles, the lower end of this gage having a concave profile 88 to engage the convex profiles of the soles.

When the machine is used to trim fins or overflow from molded rubber soles having square profiles it may be preferable to substitute a gage 90 of the type shown in Fig. 8, this gage being provided with an anti-friction roll 92 rotatably mounted thereon and arranged to run on the upper surface of the sole.

When any one of the gages 83, 86 and 90 is used, it is advantageous to use also a guard 94 (Figs. 1 and 2). This guard is affixed to the movable frame element 26 and is arranged at the feeding-in side of the upper cutter 22, its front face being substantially flush with the vertical plane of the front faces of the cutter. In practice, the front face of the guard 94 serves as an abutment for the profile of an article of work such as a rubber heel or a rubber sole and its purpose is to prevent the body of an article of work from moving so far to the rear as to encounter the sharp edges 48 of the cutters.

If desired, a gage 96 of the type shown in Fig. 9 may be used instead of the gages above described and may be attached to the frame element 26 by the screw 85. This gage like the other gages is provided with a slot 84 to receive the attaching screw 85. A wide kerf 98 divides the lower portion of the gage 96 into two spaced abutments 100 each adapted to engage the profile of a molded rubber article such as a heel or a sole. The space provided by the kerf 98 is arranged to stand in register with the nip of the cutters. The confronting portions of the abutments 100 are chamfered on the front faces, the chamfering being represented by shading. This formation is intended to conform approximately to sharply curved toes of rubber soles and to the relatively sharp curvatures of small rubber heels and permits such curved bodies to approach closely to the line or plane of the cut. In practice, the gage 96 will be adjusted to a level that will permit fins of overflow to project under it.

Fig. 4 illustrates a device designed to be used to aline the cutters 18 and 22 so that their edges 48 will register one with the other, as shown in Fig. 3. This device comprises a rigid, flat plate 102 and two clamping screws 104. Two holes are bored through the plate 102 to receive the shanks of the screws, the holes being spaced apart a distance substantially equal to the distance between the axes of the cutter shafts 10 and 24. The front ends of the shafts are drilled and provided with internal screw threads to co-operate with the screws 104. The operation of alining the cutters with this device is as follows:—Having loosened the set screw 36 (Figs. 1 and 2) to permit axial adjustment of the rod 28, and having detached any one of the gages that may be attached by the screw 85, the plate 102 is placed against the front faces of the cutters and the screws 104 are set up tightly in the sockets formed in the shafts. The plate is thus clamped tightly against the flat front faces 44 of the cutters, the upper cutter 22 being thereby shifted axially to the front or rear, as the case may be. This step places the sharp edge 48 of the upper cutter exactly in the plane of the corresponding edge 48 of the lower cutter. The adjustment thus obtained is preserved by tightening the set screw 36, after which the adjusting plate 102 may be detached and the desired gage may be attached.

Having thus described my invention, what I claim as new and desire to secure by Letters Patent of the United States is:

1. A trimming machine comprising two rotary circular disk cutters each having a narrow circumferential surface and a front face at a non-acute angle thereto and forming therewith a sharp circular edge at their line of intersection, means arranged to maintain said cutters nearly but not quite in contact with each other with said edges in a common plane and with said circumferential surfaces in registering relation, and means for rotating one of said cutters.

2. A trimming machine comprising two rotary circular disk cutters each having a narrow cylindric circumferential surface and a front face at a non-acute angle thereto and forming therewith a sharp circular edge at their line of intersection, means arranged to maintain said cutters spaced apart only so far as to avoid actual contact one with the other but with said circular edges in a common plane and said circumferential surfaces in registering relation, and means for rotating one or both of said cutters.

3. A trimming machine comprising two circular disk cutters arranged to co-operate with each other in edge-to-edge relation, two relatively movable frame elements in which said cutters, respectively, are rotatably mounted, means arranged to limit relative movement of said frame elements in one direction and thereby establish a co-operative relation of the cutters, resilient means arranged to maintain said frame elements normally in the relation necessary to insure penetration and severance of the work by the cutters but to permit forcible separation of the cutters, and means for rotating one of said cutters.

4. A trimming machine comprising a stationary frame, a movable frame operatively connected thereto, two circular disk cutters rotatively mounted in said frames, respectively, and arranged to co-operate with each other, an adjustable abutment arranged to co-operate with said movable frame to establish a co-operative relation of said cutters, resilient means arranged to maintain said movable frame normally in a position to insure penetration of the work by said cutters but to permit retraction of said movable frame for separating the cutters, and means for rotating one of said cutters.

5. A trimming machine comprising a pair of rotary circular cutting disks arranged in edge-to-edge relation, relatively adjustable frame elements in which said disks are mounted, resilient means arranged to act on one of said frame elements to insure pentration of the work by said disks, means arranged to regulate the co-operative relation of said disks, and means for rotating one of said disks.

In testimony whereof I have signed my name to this specification.

JOHN HENRY BROWN.